United States Patent
Kim et al.

(10) Patent No.: US 8,055,250 B2
(45) Date of Patent: Nov. 8, 2011

(54) APPARATUS AND METHOD FOR FUNCTION SETTING EVENT IN MOBILE TERMINAL ACCORDING TO USER POSITION INFORMATION

(75) Inventors: Hyun-Ji Kim, Gumi-si (KR); Jae-Ho Kim, Gumi-si (KR); Jeong-Wook Seo, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1329 days.

(21) Appl. No.: 11/355,080

(22) Filed: Feb. 16, 2006

(65) Prior Publication Data

US 2006/0189313 A1     Aug. 24, 2006

(30) Foreign Application Priority Data

Feb. 21, 2005  (KR) ..................... 10-2005-0014287
Jan. 27, 2006  (KR) ..................... 10-2006-0009039

(51) Int. Cl.
H04M 3/00 (2006.01)

(52) U.S. Cl. .................. 455/418; 455/412.1; 455/414.1; 455/414.2; 455/419; 455/456.1; 455/456.2; 455/456.3; 455/456.5; 455/456.6; 455/466; 455/566

(58) Field of Classification Search .... 455/414.1–414.4, 455/456.1–456.6, 457, 404.1, 404.2, 418, 455/466, 566, 412.1, 458, 564, 565, 567, 455/569.1, 569.2

See application file for complete search history.

(56) References Cited

U.S. PATENT DOCUMENTS

| 6,246,888 | B1* | 6/2001 | Tsuchiyama | 455/566 |
|---|---|---|---|---|
| 6,351,639 | B1* | 2/2002 | Motohashi | 455/420 |
| 6,360,101 | B1 | 3/2002 | Irvin | |
| 6,539,230 | B2* | 3/2003 | Yen | 455/456.1 |
| 6,625,457 | B1* | 9/2003 | Raith | 455/456.1 |
| 6,920,328 | B2* | 7/2005 | Wollrab | 455/456.1 |
| 7,043,255 | B1* | 5/2006 | Tiwari | 455/456.1 |
| 7,076,255 | B2* | 7/2006 | Parupudi et al. | 455/456.1 |
| 7,130,644 | B2* | 10/2006 | Kuwahra et al. | 455/456.3 |
| 7,206,588 | B2* | 4/2007 | Moriguchi et al. | 455/456.1 |
| 7,394,405 | B2* | 7/2008 | Godden | 340/996 |
| 2001/0005171 | A1 | 6/2001 | Farringdon et al. | |
| 2001/0049275 | A1* | 12/2001 | Pierry et al. | 455/414 |
| 2002/0068583 | A1* | 6/2002 | Murray | 455/456 |
| 2003/0129973 | A1* | 7/2003 | Oishi et al. | 455/414 |
| 2004/0176107 | A1* | 9/2004 | Chadha | 455/456.5 |
| 2004/0180674 | A1* | 9/2004 | Blomqvist et al. | 455/456.5 |
| 2004/0203644 | A1* | 10/2004 | Anders et al. | 455/414.1 |
| 2004/0203863 | A1* | 10/2004 | Huomo | 455/456.1 |
| 2004/0235464 | A1* | 11/2004 | Korkalo et al. | 455/418 |

(Continued)

FOREIGN PATENT DOCUMENTS

EP           1 008 946 A1      6/2000

(Continued)

*Primary Examiner* — Olumide T Ajibade Akonai
(74) *Attorney, Agent, or Firm* — Roylance, Abrams, Berdo & Goodman, LLP (57) ABSTRACT

An apparatus and method for a function setting event in a mobile terminal according to user position information are disclosed. According to the apparatus and method, a character agent function is added to a mobile terminal, and when an event occurs in the mobile terminal, the event occurrence and process is expressed by corresponding character User Interfaces (UIs). When user position information confirming event and function setting related event occur, they can be expressed through the character agent function.

19 Claims, 6 Drawing Sheets

U.S. PATENT DOCUMENTS

2006/0025159 A1* 2/2006 Estevez et al. ............. 455/456.3
2006/0128395 A1* 6/2006 Muhonen ................... 455/456.1

FOREIGN PATENT DOCUMENTS

| JP | 2000-311145 | 11/2000 |
| KR | 20000061089 A | 10/2000 |
| KR | 20020055788 A | 7/2002 |
| KR | 20020068754 A | 8/2002 |
| KR | 10 20030068637 A | 8/2003 |
| KR | 20040073721 A | 8/2004 |
| KR | 2005 040199 A | 5/2005 |

* cited by examiner

FIG.6

APPARATUS AND METHOD FOR FUNCTION SETTING EVENT IN MOBILE TERMINAL ACCORDING TO USER POSITION INFORMATION

PRIORITY

This application claims the benefit under 35 U.S.C. §119 (a) of Korean Patent Application Nos. 2005-14287 and 2006-9039, filed in the Korean Industrial Property Office on Feb. 21, 2005, and Jan. 27, 2006, respectively, the entire contents of which are hereby incorporated by reference.

BACKGROUND OF THE INVENTION

1. Field of the Invention

The present invention relates generally to a mobile terminal and a method therefor. More particularly, the present invention relates to a mobile terminal and a method of setting registration information in a mobile terminal according to user position information.

2. Description of the Related Art

In modern society, the number of people carrying personal mobile terminals is increasing. Users of mobile terminals now require terminals to posses additional functions such as electronic pocketbooks, Internet accessibility, as well as the capability to place simple phone calls. Accordingly, mobile terminals are provided with diverse functionality to cope with the user's requirements. In particular, users desire a schedule management function to be included in an electronic pocketbook as an additional function of the mobile terminal. Such a function stores, in advance, the user's registration of important tasks that the user should remember and helps the user not to miss important schedule items, even if the user has a very busy daily life.

A conventional schedule management function is constructed to sound an alarm when the date and time for carrying out the schedule preset by the user arrives. Accordingly, even if the user visits a specified place in advance, after having already scheduled a trip to the specified place, the user may not remember the schedule at that the time of the advanced unscheduled visit. Thus, the user may visit the place again to carry out the schedule when the date and time for carrying out the schedule arrives. For example, even if the user visits a department store in advance of a previously scheduled visit to purchase goods at the department store at a specified date, the user may not remember the schedule at that the time of the visit and may not make the necessary purchase of goods. In other words, the user can confirm the contents of the schedule only when the registered date and time for carrying out the schedule arrives, and thus the user should visit the department store again to purchase the goods. Furthermore, if the user does not change a reception notifying mode to an etiquette mode in the case where it is required to change the reception notifying mode to the etiquette mode in a specified public place in which the schedule is carried out, the alarm sound produced when the reception notifying mode is performed may cause great inconvenience to others.

SUMMARY OF THE INVENTION

Accordingly, certain embodiments of the present invention address the above and other problems occurring in the prior art, and an object of the present invention is to provide an apparatus and method capable of expressing user position information confirming event through a character agent function when the user position information confirming event occurs.

Accordingly, it is an aspect of the present invention to provide an apparatus and method capable of selecting and expressing a character user interface (UI) preset by an optimal specialist that requests to perform an operation according to user position information confirming events that occur in a mobile terminal by analyzing the corresponding events.

Another aspect of the present invention is to provide a more convenient way for enabling a user to perform function setting and operation according to a user's use pattern of a mobile terminal by analyzing user position information.

BRIEF DESCRIPTION OF THE DRAWINGS

The above and other objects, exemplary features and advantages of certain embodiments of the present invention will be more apparent from the following detailed description of certain exemplary embodiments taken in conjunction with the accompanying drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
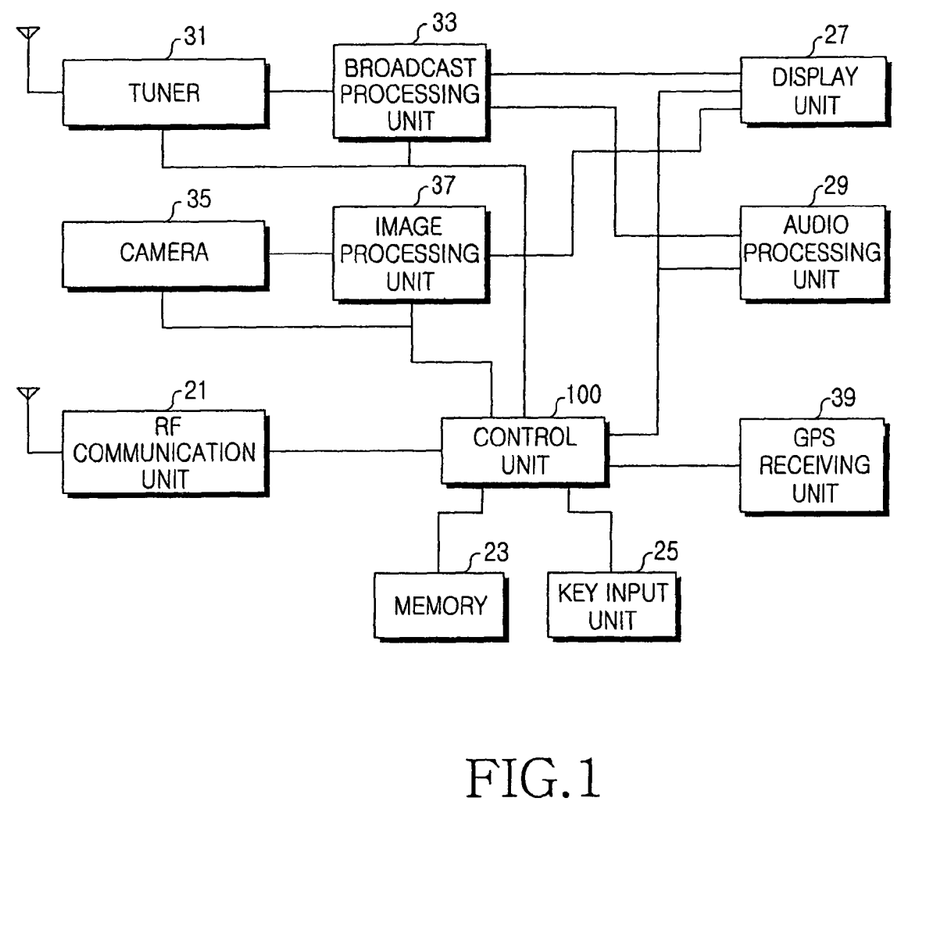
FIG. 1 is a block diagram illustrating an example of a construction of a mobile terminal to which exemplary embodiments of the present invention are applied.

FIG. 1 is a block diagram illustrating an example of a construction of a mobile terminal to which exemplary embodiments of the present invention are applied.

Referring to FIG. 1, a radio frequency (RF) communication unit 21 performs a wireless communication function of the mobile terminal. The RF communication unit 21 is provided with an RF transmitter for up-converting and amplifying a frequency of a transmitted signal, and an RF receiver for low-noise-amplifying and down-converting a frequency of a received signal. A key input unit 25 is provided with keys for inputting numerals and text information and various kinds of function keys. Also, in an exemplary embodiment of the present invention, the key input unit 25 is provided with keys for controlling character agents by events.

A memory 23 can comprise program memory and data memory. The program memory facilitates operation of programs for processing a call process of a mobile terminal as well as programs for controlling agent expression for events occurring according to an exemplary embodiment of the present invention. Data memory comprises character memory for storing character images for the agent expression according to an exemplary embodiment of the present invention. The character memory can operate as a file system, and have memory (or file system) indexes for characters. The character memory can be constructed in diverse forms, which are for effecting character movement, facial expression, private expression, and others, that are detailed constituent elements of respective characters. That is, character information may be stored in the character memory for agent expressions.

A control unit 100 controls the whole operation of a mobile terminal. The control unit 100 is provided with a modulation/demodulation modem and a codec, and performs coding/modulation of a transmitted signal and demodulation/decoding of a received signal. The control unit 100 can be a mobile station modem (MSM) chip. The control unit 100 controls the operation according to a user's mode selection, such as, for example, a communication mode, camera mode, and broadcast receiving mode. Alternatively, a data processing unit, which corresponds to the control unit from which the modem and the codec have been removed, may be independently constructed, and positioned between the RF communication unit 21 and the modem/codec. In an exemplary embodiment of the present invention, the control unit 100 is provided with an agent function unit that can process schedule-related events. The control unit 100 collects events according to the operation of the mobile terminal, and expresses the processes and states of the events as agents by controlling the agents according to the collected events. In one exemplary embodiment, the agent expression can be displayed by selecting a corresponding character from the memory 23. The agent function unit can be included in the control unit 100 or can be separately constructed. The operation of the agent function unit will be explained in detail with reference to FIG. 2.

In an exemplary embodiment of the present invention, the control unit 100 can perform the operation of the agent function unit in the same manner. That is, the control unit analyzes user position information received from a global positioning system (GPS) receiving unit 39. Also, the control unit 100 analyzes pre-registered schedules and the setting state of the mobile terminal according to the user position information. The control unit 100 may suggest that a user register schedules to be carried out at the position according to the user position information, or read a message for suggesting that a user change the setting state of the terminal and the corresponding character UI from the memory 23 and display the read message and the character UI on a display unit 27. The setting state of the mobile terminal can include the setting state of a reception notifying mode and the setting state of terminal functions.

A camera 35 for taking a picture of an object and generating an image signal is driven by the control unit 100 when the user selects the camera mode. An image processing unit 37 performs scaling of the image signal taken by the camera 35 to match the size of the display unit 27, and displays the scaled image signal through the display unit 27. The image processing unit 37 encodes and stores the image signal in a storage mode, and decodes the encoded image signal in a playback mode.

A tuner 31 selects and receives a broadcast signal of a channel set under the control of the control unit 100 in a broadcast receiving mode, and a broadcast processing unit 33 demodulates and decodes the broadcast signal received through the tuner. The broadcast processing unit 33 outputs an image signal to the display unit 27, and outputs an audio signal to an audio processing unit 29. The broadcast signal can comprise a satellite broadcast signal or a ground-wave broadcast signal.

The display unit 27 displays menus according to the operation of the mobile terminal under the control of the control unit 100, and displays a character that is outputted corresponding to an event when the event occurs. Also, the display unit 27 displays the image signal outputted from the image processing unit 37 or the broadcast processing unit 33 in a camera mode or in a broadcast receiving mode.

The audio processing unit 29 processes an audio signal generated under the control of the control unit 100 in a communication mode, processes an audio signal generated by the camera under the control of the image processing unit 37 in a camera mode, and processes an audio broadcast signal received under the control of the broadcast processing unit 33 in a broadcast receiving mode.

In the mobile terminal as constructed above, a construction for processing the camera and broadcast signal may be omitted, and the character agent function for the event according to an exemplary embodiment of the present invention can be performed. Accordingly, in an exemplary embodiment of the present invention, the character agent control for the event of the mobile terminal will be explained as the character agent control, but all images except for the character can also be applied in the same manner.

Figure 2:
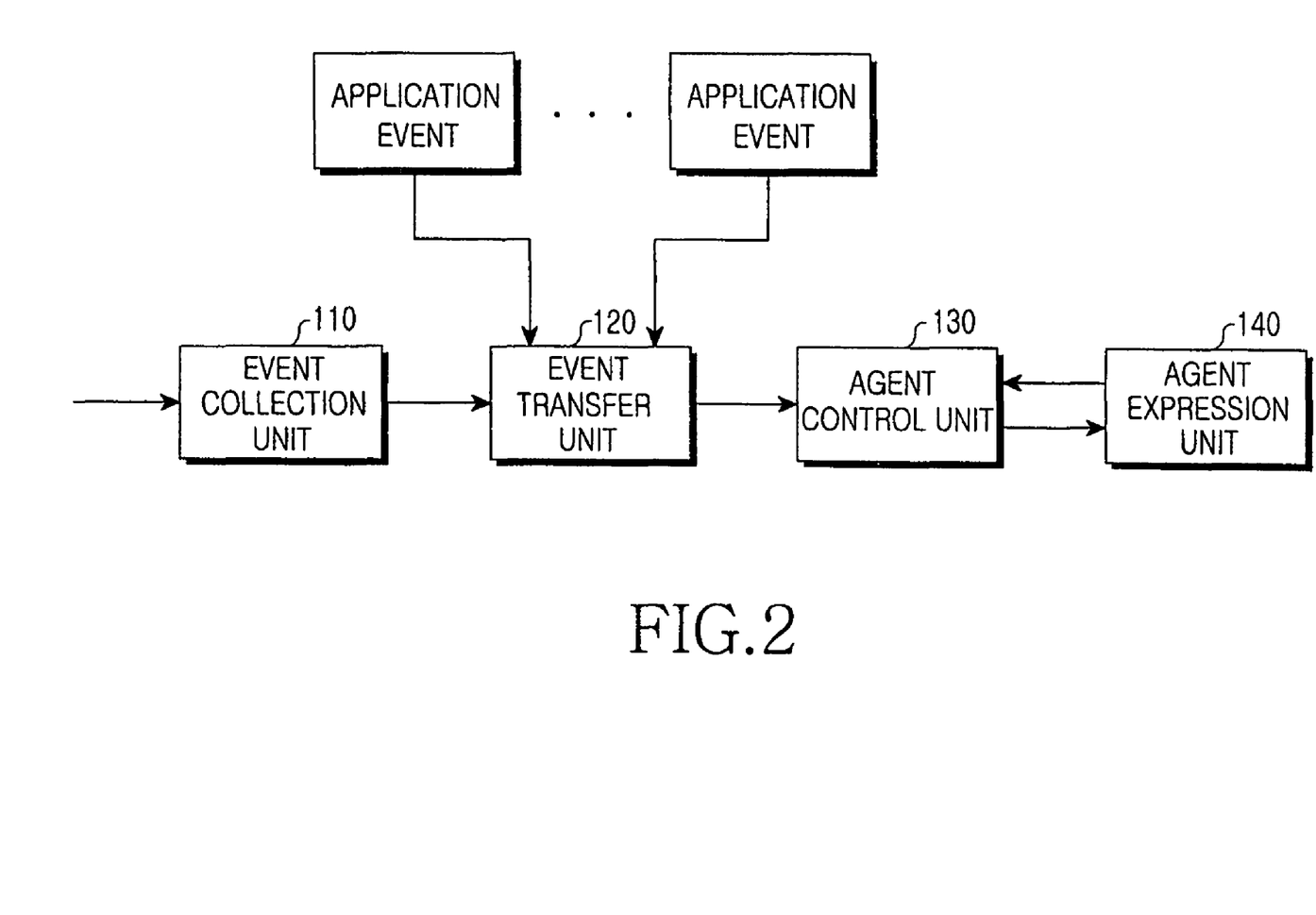
FIG. 2 is a block diagram illustrating the construction of an agent function unit included in a mobile terminal control unit according to an exemplary embodiment of the present invention.

FIG. 2 is a block diagram illustrating the construction of an agent function unit included in a mobile terminal control unit according to an exemplary embodiment of the present invention.

Referring to FIG. 2, an event collection unit 110 collects events occurring in the mobile terminal. The events include various possible events of the mobile terminal such as communication events of the mobile terminal, events occurring in the mobile terminal itself, events occurring according to a user's request, and events according to the performing of a mobile terminal's multimedia function. The events collected by the event collection unit 110 become the events defined in the mobile terminal. The event collection unit 110 generates an event message as information for identifying the corresponding event, and provides the event message to an event transfer unit 120. In an exemplary embodiment of the present invention, the event collection unit 110 collects schedule-related events, and these events can include a schedule start and end event, a reception notifying mode switchover event according to the start and end of the schedule, a holiday timer event, an anniversary timer event, and a things-to-do timer event.

The event transfer unit 120 transfers the event message provided from the event collection unit 110 to a corresponding client. In the following description of the present invention, it is exemplified that the event transfer unit 120 transfers the event message only to the agent control unit 130. However, in the case where another constituent unit requires that the transfer of the event message exists, the event transfer unit 120 may transfer the message to the corresponding constituent unit. Also, in addition to the events collected by the event collection unit 100, the event transfer unit 120 receives user-defined events that are not defined in the mobile terminal, and transfers the user definition events to the agent control unit 130. The user-defined events are called application events, which may be events occurring by games, other application programs, and web service programs.

The agent control unit 130 stores the event messages transferred from the event transfer unit 120 in an internal buffer, analyzes the event messages, and determines the UIs so that it can express the corresponding character agents. The event messages transferred from the event transfer unit 120 may be events of the mobile terminal (for example, events collected by the event collection unit 100) and application events. In the following description, explanation will be made around the agent expressions of the events collected by the event collection unit 110. The agent control unit 130 comprises a plurality of specialists, and performs an agent control function by selecting a specialist corresponding to the event as controlling the specialists. If an event is received, the agent control unit 130 reports the occurrence of the event to proper specialists according to the collected event, and requests the UI to an agent expression unit 140 so that the agent expression of the finally selected specialist can be displayed. Then, the agent control unit processes user's feedback information on the corresponding event according to the user's feedback information received from the agent expression unit 140.

The agent expression unit 140 displays the character expression of the corresponding event according to the agent UI information outputted from the agent control unit 130. At this time, the agent expression unit 140 manages a plurality of character UIs to be displayed on the display unit 27, and performs a control operation so as to display the corresponding character according to the UI information requested by the agent control unit 130. If the user produces the feedback information in a state that the character according to an event occurrence is displayed, the agent expression unit 140 transmits the received feedback information to the agent control unit 130. The agent control unit 130 performs the agent control according to the user's feedback information received from the agent expression unit 140.

In the case of processing only the events of the mobile terminal collected by the event collection unit in the construction as illustrated in FIG. 2, the event transfer unit 120 can be omitted. The internal buffer of the agent control unit 130 can be called a blackboard.

The construction and operation of the agent control unit as described above will be explained in more detail.

The agent control unit 130 comprises a plurality of specialists that are called according to respective event types, perform preset special tasks, and then output the results of special tasks, a blackboard used for storing various kinds of information including information of the event messages, a supervision unit for selecting one of the specialists in the case where the specialists output effective results, a character numerical value storage unit for storing character numerical values according to the event occurrence, and a specialist management unit for selecting corresponding specialists from a list of specialists by events when an event occurs, and controlling the agent according to the event.

The specialist, that contributes to the solving of problems, serves to write a solution at an intermediate stage on the blackboard with the specialty for a limited part, and provides the priority and user preference for the solution at the intermediate stage as well. The respective specialists are requested to calculate the priority and user preference by grasping the state of the blackboard, and write the solution of the intermediate stage on the blackboard.

The blackboard is a working environment and an information space where the specialists communicate with one another. Basically, the blackboard enables the specialist to write the solution of the intermediate stage. The advantage of the blackboard pattern is as follows. First, it can easily unify different types of specialists. Second, it can be independently modularized and developed since the respective specialists exert a little influence upon one another. Third, it is flexible with respect to various changes (for example, specialists' algorithm changes and addition of new specialists).

If two or more specialists are selected for one event, the specialist management unit requests the supervision unit to select the specialist that is in the closest correlation with the received event. Then, the supervision unit selects the specialist that has the closest correlation with the event by analyzing data of the blackboard, the priority and user preference according to the event, and so on.

The internal numerical value of a character can be changed by various kinds of events occurring from the mobile terminal, agent function, and user's feedback. In addition, various application events that can use the character numerical value affect the character numerical value. As the internal numerical value of the character is changed, the character interface is changed, and with the lapse of time, the character appears to grow up. This is the concept of character building. The mobile terminal according to an exemplary embodiment of the present invention introduces the character building based on an artificial-intelligence agent system. In the exemplary embodiment of the present invention, by proposing and notifying various character movements to the user on the basis of diverse events occurring in the mobile terminal, the user can use the terminal more efficiently. Also, the character numerical value is changed according to such events and the corresponding user's feedback actions.

Hereinafter, in explaining the function-setting event processing operation of the mobile terminal according to user position information, the event processing operation under the control of the agent function unit and the event processing operation under the control of the control unit 100 will be explained in detail with reference to FIGS. 3 to 6. In the exemplary embodiment of the present invention, it is defined that the user's position is the same as the mobile terminal's position. Also, it is exemplified that the setting state of the mobile terminal refers to the confirming of the reception notifying mode and the scheduling mode. In addition to these mode, the functions and the setting state of the mobile terminal can be analyzed.

Figure 3:
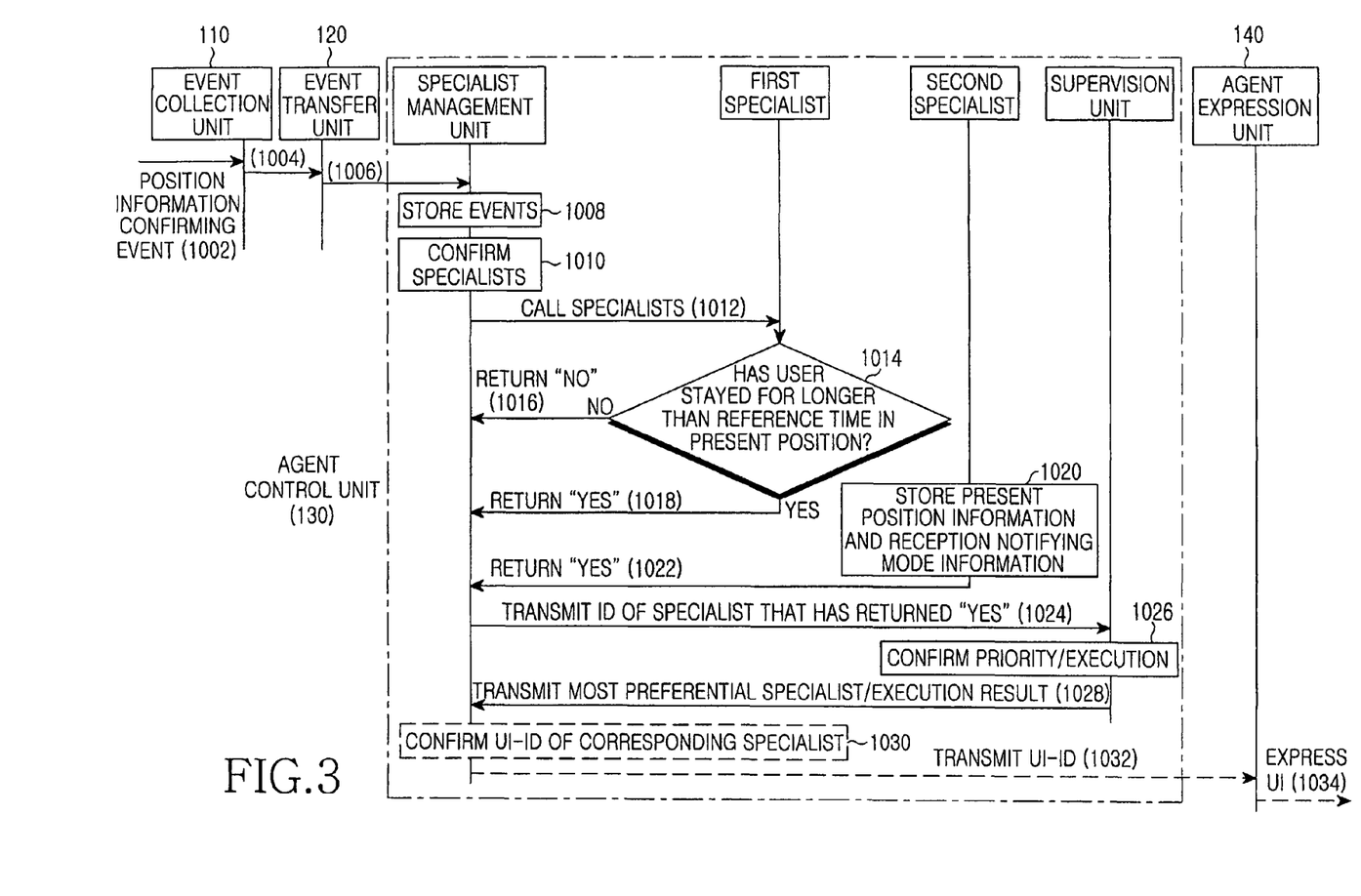
FIG. 3 is a flowchart illustrating a process for user position confirming timer event that is performed in an agent function unit according to an exemplary embodiment of the present invention.

FIG. 3 is a flowchart illustrating a process for user position confirming timer event that is performed in an agent function unit according to an exemplary embodiment of the present invention.

Referring to FIG. 3, if a preset user position information confirming event occurs, the event is collected by the event collection unit 110 in step 1002, then is provided to the event transfer unit 120 in step 1004. The event transfer unit 120 provides the event to the specialist management unit of the agent control unit 130 in step 1006. The specialist management unit stores the received user position information confirming timer event in the blackboard in step 1008. Then, the specialist management unit confirms the specialists that are called from the internal specialist list during the user position information confirming timer event in step 1010. Also, the specialist management unit calls the respective specialists in step 1012 (in the exemplary embodiment of FIG. 3, it is exemplified that first and second specialists are called).

The called first specialist confirms whether the user has stayed in the present position for longer than a reference time in step 1014. If the user has not stayed in the present position for longer than the reference time as a result of confirmation, the first specialist proceeds to step 1016 and returns "NO" to the specialist management unit. If the user has stayed in the position for longer than the reference time, the first specialist proceeds to step 1018, and returns "YES" to the specialist management unit. In addition, the called second specialist stores the user's present position information and the reception notifying mode information, and then returns "YES," step 1022, to the specialist management unit in step 1020.

When the called specialists perform the returns, the specialist management unit provides the specialists that have returned "YES" to the supervision unit in step 1024. The supervision unit confirms the priorities of the corresponding specialists, and whether the corresponding specialist is under execution if only one specialist has returned "YES" in step 1026. Then, the supervision unit transits the result of confirmation to the specialist management unit in step 1028. Accordingly, the specialist management unit confirms the UI identification (UI-ID) preset for the corresponding specialist in step 1030, and then transmits the UI-ID to the agent expression unit 140 in step 1032. The agent expression unit 140 expresses the corresponding UI in step 1034. In the exemplary embodiment of the present invention, the UI that is expressed by the agent expression unit 140 and then displayed can include a message for the user's present position information and the corresponding character UI, and a message for notifying or suggesting the storage of the user's present position information and the present setting state of the mobile terminal in a memory 27 and the corresponding character UI. Although being not illustrated, a message for notifying a user's departure from the present position and the corresponding character UI may be displayed if the user has not stayed for the reference time in the present position, and the user's departure may be judged by the first or second specialist or a separately called specialist.

Figure 4:
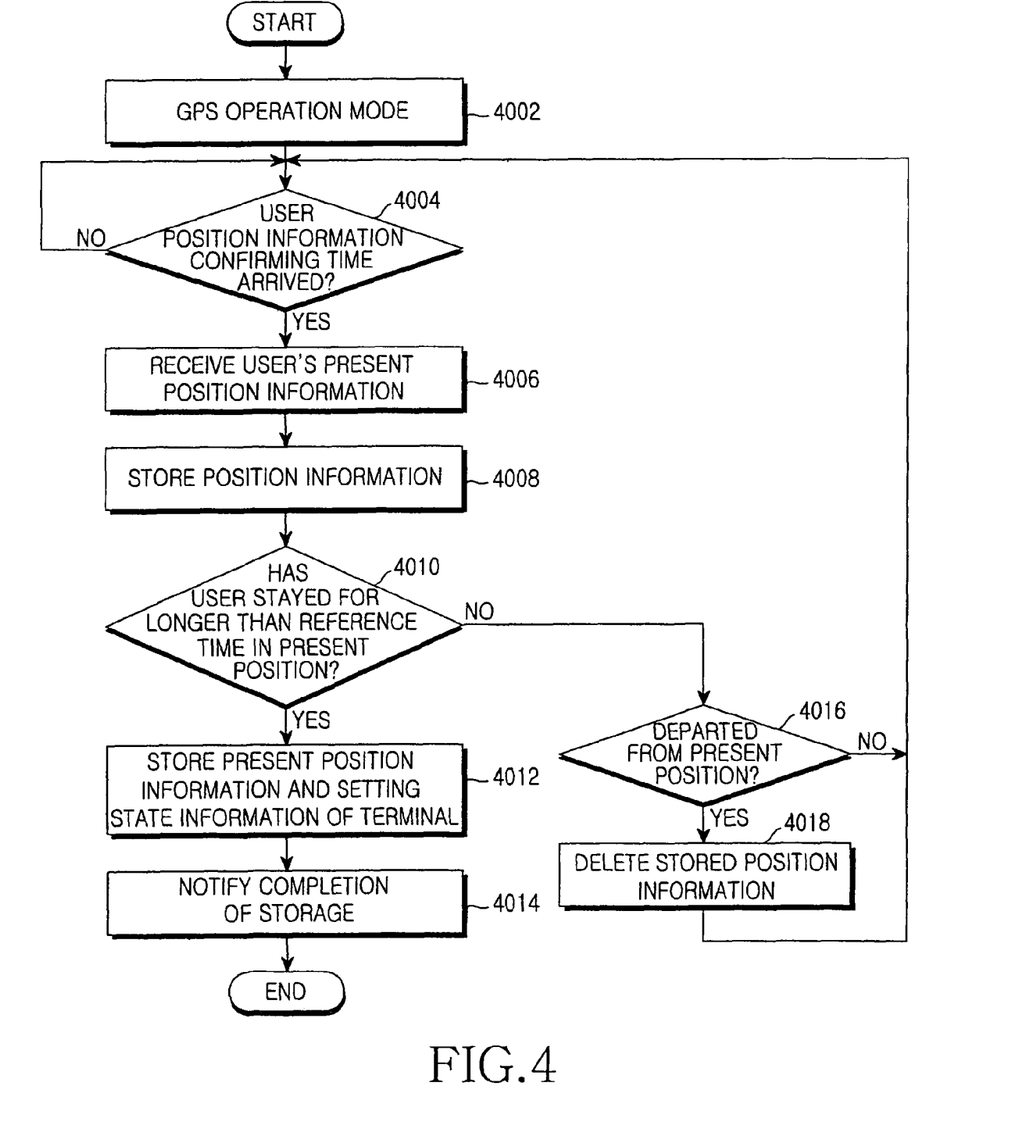
FIG. 4 is a flowchart illustrating a process for user position confirmation that is performed in a control unit according to another exemplary embodiment of the present invention.

FIG. 4 is a flowchart illustrating a process for user position confirmation that is performed in a control unit according to another exemplary embodiment of the present invention.

Referring to FIG. 4, the control unit 100 performs a GPS operating mode that operates a GPS for receiving the user position information through a GPS receiving unit 39 in step 4002. The control unit 100 confirms whether a preset time for receiving the user position information from the GPS elapses in step 4004. For example, if a time period for confirming the user position information is set to 5 minutes, the control unit judges whether 5 minutes elapses after the previous user position information was analyzed in step 4004. If the confirmation time period has elapsed, the control unit 100 judges that the user position information confirming time arrives, and receives the user's present position information through the GPS receiving unit in step 4006.

The control unit 100 then stores the user position information received in step 4006 in the memory in step 4008. Then, the control unit judges whether the user has stayed in the present position for longer than the reference time by confirming the user position information stored in the memory 27 in step 4010. For example, the control unit 100 confirms whether the user has stayed in the position for longer than 30 minutes in step 4010. If it is confirmed that the user has stayed in the present position for longer than the reference time in step 4010, the control unit 100 stores the user's present position information, terminal registration information, and function setting state information in step 4012. The control unit 100 can delete the stored data by confirming the user position information for the time preset in step 4008. After the control unit 100 confirms that the storage of present user position information, terminal registration information, and function setting state information is completed, it displays a message for notifying the completion of the storage to the user and the corresponding character UI in step 4014.

If it is confirmed that the user has not stayed for longer than the reference time in the present position in step 4010, the control unit 100 proceeds to step 4016, and judges whether the user has departed from the present position. The user's departure from the present position means the departure from a predetermined range around the present position. If it is judged that the user has departed from the present position in step 4016, the control unit 100 displays a message for notifying the user's departure from the present position and the corresponding character UI, and then deletes the user position information stored in the memory 27 in step 4018. Thereafter, the control unit judges again whether the user position information confirming time elapses in step 4004.

Figure 5:
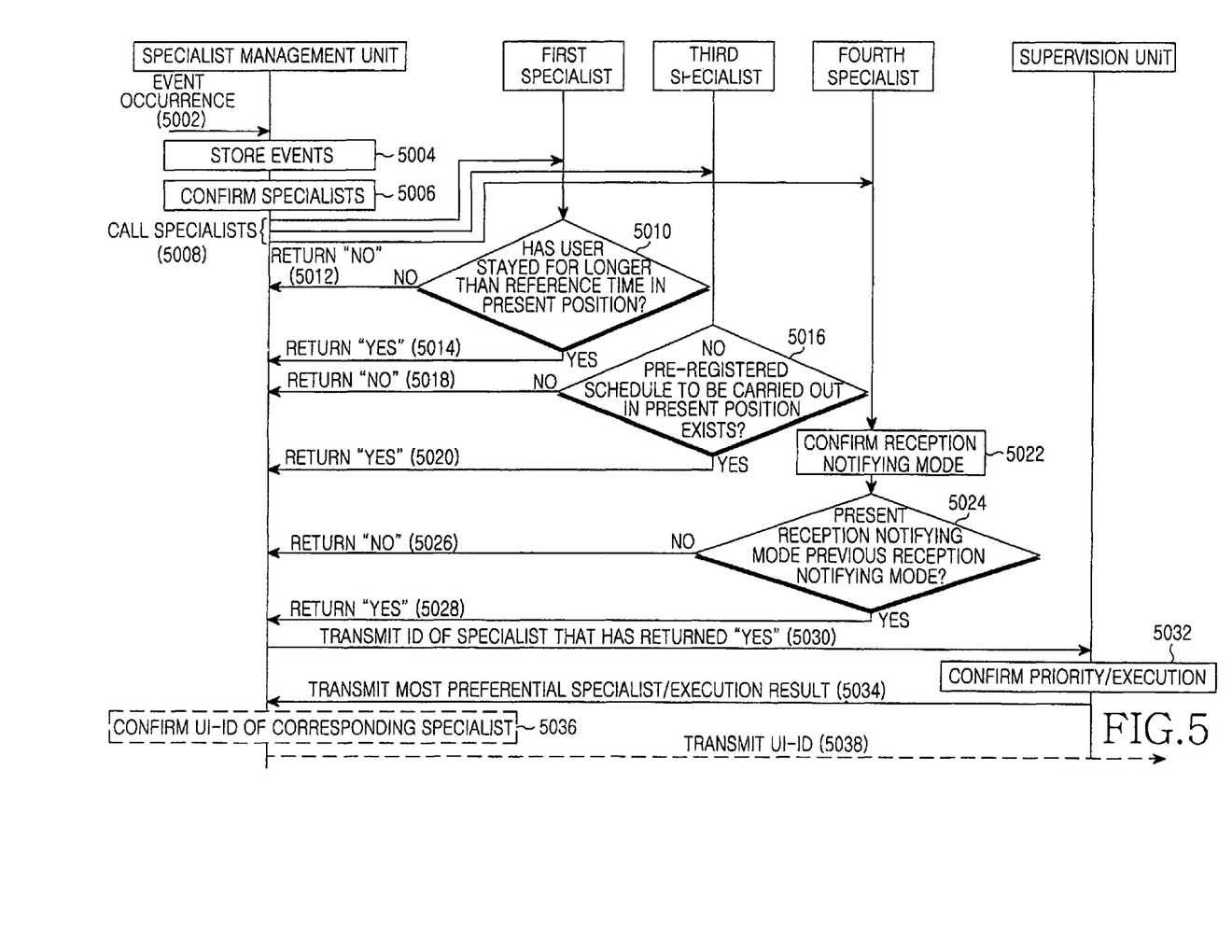
FIG. 5 is a flowchart illustrating a process for a mobile terminal registration information changing event that is performed in an agent function unit according to an exemplary embodiment of the present invention.

FIG. 5 is a flowchart illustrating a process for a mobile terminal registration information changing event that is performed in an agent function unit according to an exemplary embodiment of the present invention.

Referring to FIG. 5, a specialist corresponding to the preset user position information confirming event is transferred to the specialist management unit in step 5002. The specialist management unit stores the timer event received in step 1004 in the blackboard in step 5004. The specialist management unit then confirms the specialists that are called from the internal specialist list during the user position information confirming timer event in step 5006. Also, the specialist management unit calls the respective specialists in step 5008 (in the exemplary embodiment of FIG. 5, calling of a first, third, and fourth specialists are illustrated).

The first specialist, when called, confirms whether the user has stayed in the present position for longer than a reference time received from the GPS receiving unit 39 in step 5010. If the user has not stayed in the present position for longer than the reference time as a result of confirmation, the first specialist proceeds to step 5012 and returns "NO" to the specialist management unit. If the user has stayed in the position for longer than the reference time, the first specialist proceeds to step 5014, and returns "YES" to the specialist management unit.

The third specialist, when called, confirms whether a pre-registered schedule to be carried out in the present position exists in step 5016. The pre-registered schedule comprises pre-inputted information on the position in which the registered schedule is to be carried out, and the schedule registered by the user to be carried out in the present position. Accordingly, if the schedule to be carried out in the present position exists in step 5016, the third specialist proceeds to step 5018, and returns "NO" to the specialist management unit. If no schedule to be carried out in the present position exists, the third specialist returns "YES" to the specialist management unit in step 5020.

The fourth specialist, when called, confirms the reception notifying mode state of the mobile terminal in the present position in step 5022. The fourth specialist then compares the present reception notifying mode with the reception notifying mode previously set in the present position in step 5024. If the presently set reception notifying mode is identical to the previously set reception notifying mode in step 5024, the fourth specialist proceeds to step 5026, and returns "NO" to the specialist management unit. If the presently set reception notifying mode is not identical to the previously set reception notifying mode, the fourth specialist proceeds to step 5028, and returns "YES" to the specialist management unit.

When the specialists that has been called performs a return, the specialist management unit provides the ID of the specialists that have returned "YES" to the supervision unit in step 5030. The supervision unit confirms the priorities of the corresponding specialists, and whether the corresponding specialist is under execution if only one specialist has returned "YES" in step 5032. Then, the supervision unit transmits the result of confirmation to the specialist management unit in step 5034. Accordingly, the specialist management unit confirms the UI identification (UI-ID) preset for the corresponding specialist in step 5036, then transmits the UI-ID to the agent expression unit 140 in step 5038. The agent expression unit 140 expresses the UI corresponding to the received UI-ID. In an exemplary embodiment of the present invention, the UI that is expressed by the agent expression unit 140 can include a message for suggesting the registration of the schedule to be carried out in the present position and the corresponding character UI, and a message for suggesting the change of the reception notifying mode in the present position to the reception notifying mode previously set in the present position. For example, if the power was in an OFF state in the present position in the past, a message for suggesting the power off of the mobile terminal and the corresponding character UI may be displayed.

Although not illustrated, in the case where the user has changed or modified functions, such as a bell sound change and an alarm setting, of the mobile terminal in the present position where the user exists, a message for suggesting the change or modification of the mobile terminal functions in the present position and the corresponding character UI may be displayed.

Figure 6:
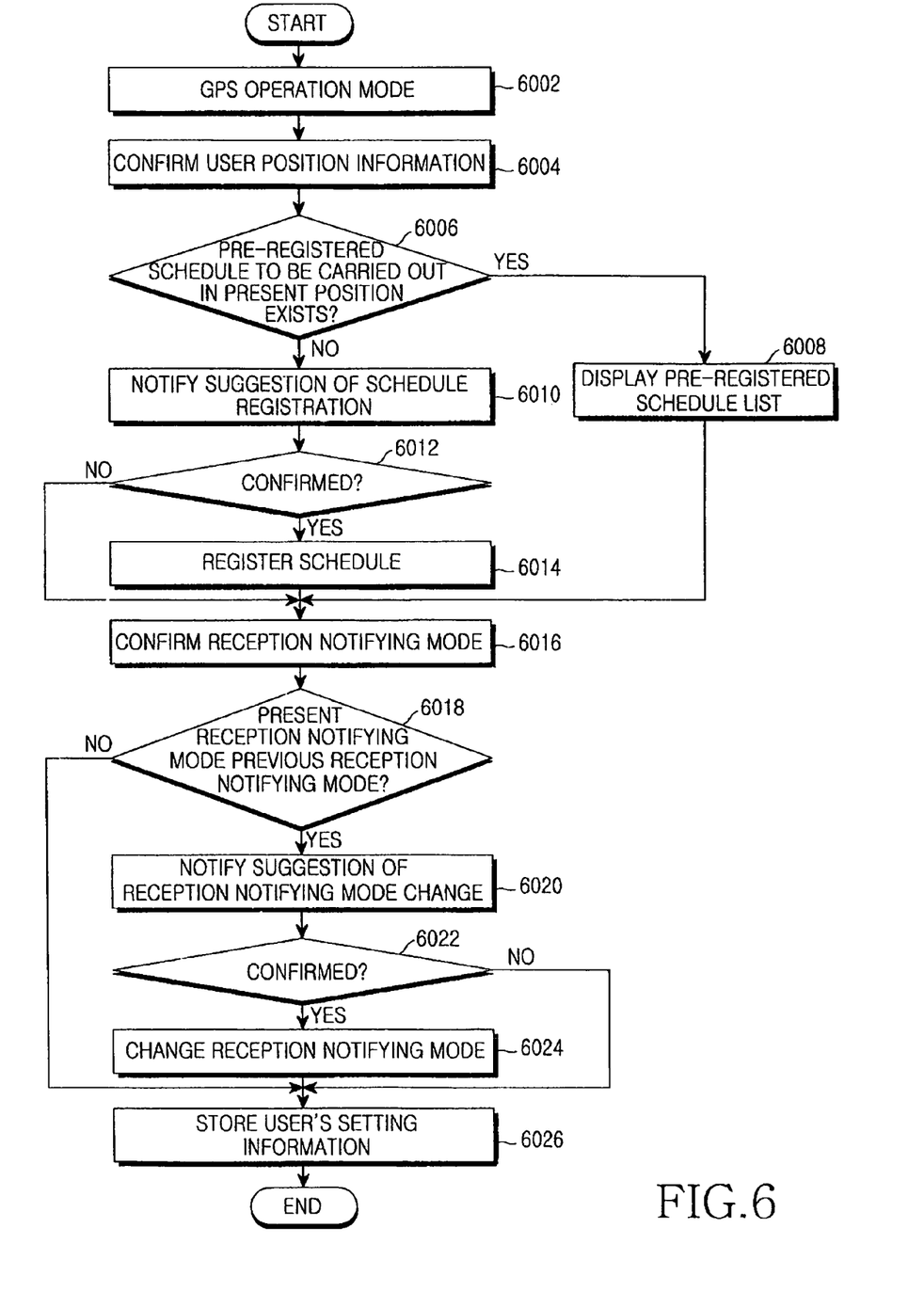
FIG. 6 is a flowchart illustrating a process for a mobile terminal registration information changing event that is performed in a control unit according to another exemplary embodiment of the present invention.

FIG. 6 is a flowchart illustrating a process for a mobile terminal registration information changing event that is performed in a control unit according to another exemplary embodiment of the present invention.

Referring to FIG. 6, GPS operation mode is selected in step 6002 and the control unit 100 confirms the user position information through the GPS receiving unit 39 in step 6004. The control unit 100 then judges whether a pre-registered schedule to be carried out in the present position exists by confirming schedule data stored in the memory 27 in step 6006. As described in detail with reference to FIG. 5, the pre-registered schedule comprises pre-inputted information on the position in which the registered schedule is to be carried out, and the schedule registered by the user to be carried out in the present position.

If the pre-registered schedule to be carried in the present position exists as a result of judgment in step 6006, the control unit 100 displays the pre-registered schedule list in step 6008. By contrast, if no pre-registered schedule exists, the control unit displays a message for suggesting the registration of a new schedule to be carried out in the present position and a character UI corresponding to the message in step 6010. The control unit 100 then confirms the message being displayed, and then judges whether schedule registration according to the message is to be performed in step 6012. If it is judged that schedule registration is to be performed, the control unit 100 receives the registration of the schedule to be carried out in the present position from the user by executing a schedule menu in step 6014.

If an input of a confirmation key for notifying the completion of the schedule registration is confirmed, the control unit 100 confirms the presently set reception notifying mode in step 6016. The control unit 100 then judges whether the present reception notifying mode is identical to the previous reception notifying mode set more than a predetermined number of times in the present position in step 6018. If the present reception notifying mode is not identical to the previous reception notifying mode, the control unit 100 displays a message for suggesting the change of the present reception notifying mode to the previous reception notifying mode and the corresponding character UI in step 6020.

After confirming the message, the control unit 100 judges whether a signal for performing the reception notifying mode change according to the message has been received in step 6022. If the signal for changing the reception notifying mode has been received as a result of judgment in step 6022, the control unit changes the present reception notifying mode to the previous reception notifying mode by executing a reception notifying mode change menu in step 6024. Then, if the change of the reception notifying mode is completed, the control unit 100 proceeds to step 6026, and stores the schedule registered in step 6014 and the reception notifying mode information changed in step 6024.

In the exemplary embodiment of FIG. 6, only the functions according to the reception notifying mode and schedule registration are performed. However, in the case where the functions such as the bell sound change and the alarm setting of the mobile terminal are changed or modified in the present position where the user exists, a message for suggesting the change or modification of the function in the present position and the corresponding character UI can be displayed.

While the present invention has been particularly shown and described with reference to certain exemplary embodiments thereof, it will be understood by those of ordinary skill in the art that various changes in form and detail may be made therein without departing from the spirit and scope of the present invention as defined by the appended claims and equivalents thereof.

What is claimed is:

1. An apparatus for a function setting event in a mobile terminal according to user position information, the apparatus comprising:
   a memory for storing character user interface images according to a user position information confirming event and a function setting event, and storing the user position information;
   a global positioning system (GPS) receiving unit for receiving the user position information;
   an event collection unit for sensing an event occurrence and generating an event message for identifying the corresponding event;
   an agent control unit, comprising a plurality of specialists to perform an agent control according to a type of the events, for determining a specialist to perform an agent control corresponding to the event message, among the plurality of specialists, selecting a character user interface according to the events from among agent expressions of the determined specialist and outputting the character user interface on the mobile terminal; and
   an agent expression unit for accessing and outputting a character image and text corresponding to the character user interface according to the events.

2. The apparatus as claimed in claim 1, wherein the agent control unit further comprises a specialist that generates a timer event when a user position information confirming time point arrives, the user position information is received from the GPS receiving unit if the timer event occurs, and a message is displayed for notifying the user's present position and a corresponding character user interface.

3. The apparatus as claimed in claim 1, wherein the agent control unit causes display of the user position information and the present setting state of the mobile terminal received from the GPS receiving unit, the agent control unit further comprising a specialist for storing information being displayed in the memory.

4. The apparatus as claimed in claim 1, wherein the agent control unit further comprises a specialist that judges whether a pre-registered schedule to be carried out in the user's present state exists according to the user position confirming event, and displays the pre-registered schedule depending on the existence of the pre-registered schedule or displays a message for suggesting registration of a schedule and a corresponding character user interface.

5. The apparatus as claimed in claim 1, wherein the agent control unit further comprises a specialist that judges whether any function set more than the predetermined number of times in the present position in the past exists according to the user position information confirming event, and displays a message for suggesting setting of the function and a corresponding character user interface depending on the existence of the set function.

6. The apparatus as claimed in claim 1, wherein the GPS receiving unit is configured to confirm a user's position for a preset period set by the user.

7. The apparatus as claimed in claim 1, wherein the memory is configured to store the user position information received from the GPS receiving unit, delete the user position information stored in the memory if the specialist judges that the user exists in the present position for longer than a reference time, groups and stores the present position information and the setting state of the mobile terminal that exist for longer than the reference time.

8. The apparatus as claimed in claim 1, wherein the memory is configured to store:
a message for confirming the user position information and a corresponding character user interface; a message for notifying storage of the user position information and the setting state of the mobile terminal and a corresponding character user interface; a message for suggesting a schedule registration according to the user position information and a corresponding character user interface; and a message for suggesting a change of the setting state of the mobile terminal according to the user position information and a corresponding character user interface.

9. A method for processing a function setting event in a mobile terminal according to user position information, the method comprising:
storing user position information confirming event when the user position information confirming event occurs;
confirming specialists preset to process a corresponding user position information confirming event among a plurality of specialists to perform an agent control according to a type of an event, in order to perform an agent control for the event;
performing an agent control for the corresponding event by calling the confirmed specialists;
confirming the results of the process by the specialists that have performed an agent control of the event; and
displaying on the mobile terminal an expression related to the results of the process preset by the specialists according to the results of process.

10. The method as claimed in claim 9, wherein the specialists that confirm the user position information and the state information of the mobile terminal during the user position information confirming event comprise first and second specialists, the method further comprising:
confirming the user position information by the first specialist and judging whether the user has stayed in the position for a preset time;
storing the present position information and setting state of the mobile terminal by the second specialist; and
displaying a message for notifying the present position and the setting state of the mobile terminal and a corresponding character user interface.

11. The method as claimed in claim 9, wherein the setting state of the mobile terminal comprises a reception notifying mode of the mobile terminal, a power on/off state, and setting states of respective menus.

12. The method as claimed in claim 10, further comprising:
confirming the user position information for each preset time period by the first specialist;
storing, preferentially by the second specialist, the user's present position information confirmed by the first specialist for the present time period in a memory;
judging, by the first specialist, a user's departure from the present position if the user has stayed in the present position for less than a reference time; and
deleting, by the second specialist, the user position information preferentially stored in the memory by the second specialist.

13. The method as claimed in claim 10, wherein the specialists that stores a schedule confirming event among the user position information confirming event and a setting state confirming event of the mobile terminal comprise third and fourth specialists, the method further comprising:
judging, by the third specialist, whether a pre-registered schedule to be carried out in the user's position exists when the event occurs;
displaying a message for suggesting registration of a schedule to be carried out in the position and a corresponding character user interface if no schedule exists as a result of judgment;
confirming, by the fourth specialist, the setting state of the mobile terminal;
judging whether the present setting state is identical to the state of the mobile terminal previously set in the present position; and
displaying a message for suggesting a change of the present setting state of the mobile terminal to the previous setting state and a corresponding character user interface if the present setting state is not identical to the previous setting state as determined by the judging.

14. A method for processing a function setting event in a mobile terminal according to user location information, the method comprising:
confirming user location information received through a global positioning system (GPS) receiving unit for a preset period;
judging whether a user has stayed in the location for longer than a reference time;
storing the user location information and a state setting information of the mobile terminal if the user has stayed in the location for longer than the reference time as determined by the judging; and
second judging whether a pre-registered schedule to be carried out in the location exists after storing the user location information and the state setting information of the mobile terminal.

15. The method as claimed in claim 14, further comprising:
confirming and storing the user location information in a memory for the preset period; and
deleting the user location information stored in the memory if the user has stayed in the location for less than the reference time.

16. The method as claimed in claim 14, further comprising:
    displaying a message for suggesting registration of a schedule to be carried out in the location and a corresponding character user interface if no schedule exists as determined by the second judging; and
    receiving the registration of the schedule to be carried out in the location according to the user's setting.

17. The method as claimed in claim 16, wherein the pre-registered schedule comprises the schedule pre-registered in the location by the user and the location information registered when the schedule to be carried out in the location is registered.

18. The method as claimed in claim 14, further comprising:
    third judging the setting state of the mobile terminal set more than a predetermined number of times in the location after storing the user location information and the state information of the mobile terminal;
    displaying a message for suggesting change of the setting state of the mobile terminal and a corresponding character user interface if the set information of the mobile terminal set more than the predetermined number of times in the location as determined by the third judging; and
    changing the function of the mobile terminal set in the location according to the user's setting.

19. The method as claimed in claim 18, wherein the setting state of the mobile terminal comprises a reception notifying mode of the mobile terminal, a power on/off state, and setting states of respective menus.

* * * * *